US008347911B2

(12) United States Patent
Stocker, Jr. et al.

(10) Patent No.: US 8,347,911 B2
(45) Date of Patent: Jan. 8, 2013

(54) VACUUM RELIEF VALVE AND METHOD FOR ASSEMBLING THE SAME

(75) Inventors: Theodore Arthur Stocker, Jr., Florissant, MO (US); Christopher Andrew Edmonds, St. Charles, MO (US)

(73) Assignee: American Railcar Industries, Inc., St. Charles, MO (US)

( * ) Notice: Subject to any disclaimer, the term of this patent is extended or adjusted under 35 U.S.C. 154(b) by 478 days.

(21) Appl. No.: 12/568,904

(22) Filed: Sep. 29, 2009

(65) Prior Publication Data

US 2011/0073199 A1    Mar. 31, 2011

(51) Int. Cl.
*F16K 17/04* (2006.01)
*B65D 90/34* (2006.01)

(52) U.S. Cl. .............. 137/526; 137/559; 137/315.33

(58) Field of Classification Search ............ 137/15.19, 137/315.33, 329.01, 377, 382, 522, 526, 137/541, 550, 559; 222/154; 73/323; 116/276
See application file for complete search history.

(56) References Cited

U.S. PATENT DOCUMENTS

| | | | | | |
|---|---|---|---|---|---|
| 1,541,538 | A | * | 6/1925 | Tunnell | 137/526 |
| 1,611,457 | A | * | 12/1926 | Keller | 137/541 |
| 1,819,827 | A | * | 8/1931 | Thwaits | 137/526 |
| 3,323,484 | A | * | 6/1967 | Minkin et al. | 116/276 |
| 3,833,014 | A | | 9/1974 | Scheetz | |
| 4,210,254 | A | * | 7/1980 | Parsons et al. | 220/564 |
| 4,278,107 | A | | 7/1981 | Dugge et al. | |
| 4,497,332 | A | * | 2/1985 | Sewell et al. | 137/15.12 |
| 4,986,138 | A | * | 1/1991 | Spencer | 73/864.34 |
| 5,960,823 | A | * | 10/1999 | Wilkins | 137/516.25 |
| 2008/0163938 | A1 | | 7/2008 | Komara | |
| 2010/0180962 | A1 | * | 7/2010 | Degutis et al. | 137/526 |

OTHER PUBLICATIONS

"Sight Glass Safety Fitting", Squibb-Taylor Company, Dec. 1, 2005 http://www.squibbtaylor.com/brochures/squibb/sightglassadd.pdf.*
"General Purpose Tank Car Valves and Fittings", Salco Marketing, modified May 4, 2011, http://salcoproducts.com/resources/category/3/5/7/4/documents/gp-tank-car.pdf.*
"Pressure Relief Valves—Top Style—A-1700-SJ Series and A-1704-SJ Series", Midland Manufacturing Corp, Nov. 2, 2007, http://www.midlandmfg.net/documents/midland/documents/datasheets/a-1700-sj-a-1704-sj.pdf.*
Vacuum Relief Valves Home Web Page; Midland Manufacturing; 1 page; http://www.midlandmfg.net/www/en/midland/products/rail/vacuumreliefvalves/index.jsp.
"Vacuum Relief Valves Operation and Maintenance", Doc. No. A-205/A-222 Rev. 1.2, Midland Manufacturing Corp., Jun. 2005, pp. 1-5; http://www.midlandmfg.net/documents/midland/iomdocs/a-205-a-222-vacuum-relief.pdf.

(Continued)

*Primary Examiner* — John K Fristoe, Jr.
*Assistant Examiner* — Seth W Mackay-Smith
(74) *Attorney, Agent, or Firm* — Armstrong Teasdale LLC

(57) ABSTRACT

A vacuum relief valve is provided. The vacuum relief valve includes a body having a side wall, and a stem that is movable with respect to the body between an open position and a closed position. The stem is biased in the closed position. The vacuum relief valve further includes a first sight glass coupled to the body and configured to enable visual inspection of a sealing area of the vacuum relief valve. The sealing area includes at least a portion of said stem.

24 Claims, 8 Drawing Sheets

OTHER PUBLICATIONS

Vacuum Relief Valves, Design Sheet, A-215-WH, A-217-WH, A-217-WH-MO, Revision 4.0, 2002 Midland Manufacturing Corp., Dec. 1, 2003, p. 9; http://www.midlandmfg.net/documents/midland/documents/ datasheets/a-215-wh-a-217-wh-a-217-wh-mo.pdf.

Vacuum Relief Valves, Design Sheet, A-215-W, A-217-W, A-217-W-MO, Revision 4.0, 2002 Midland Manufacturing Corp., May 20, 2004, p. 8; http://www.midlandmfg.net/documents/midland/documents/datasheets/a-215-w-a-217-w-a-217-w-mo.pdf.

"No Step Vacuum Relief Valve ensures safe ethanol loading, transportation and unloading", Midland Manufacturing Corp., Advertising Flyer, pp. 1-2, http://www.midlandmfg.net/documents/midland/documents/sales/no-step-flyer.pdf.

Vacuum Relief Valves, Design Sheet, A-215-W-NS, A-217-W-NS, Revision 4.0, 2002 Midland Manufacturing Corp., Jan. 21, 2005, 1 page, http://www.midlandmfg.net/documents/midland/documents/datasheets/a-215-w-ns-a-217-w-ns.pdf.

Vacuum Relief Valves, Design Sheet, A-217-WS, Revision 4.0, 2002 Midland Manufacturing Corp., Mar. 5, 2004, 1 page, http://www.midlandmfg.net/documents/midland/documents/datasheets/a-217-ws.pdf.

Vacuum Relief Valves Design Sheet, A-209-W, A-209-W-MO, Revision 4.0, 2002 Midland Manufacturing Corp., Feb. 4, 2004, 1 page, http://www.midlandmfg.net/documents/midland/documents/datasheets/a-209-w-a-209-w-mo.pdf.

Vacuum Relief Valves, Design Sheet, A-209-W-NS, A-209-NS-MO, Revision 4.0, 2002 Midland Manufacturing Corp., Mar. 18, 2005, 1 page, http://www.midlandmfg.net/documents/midland/documents/datasheets/a-209-w-ns-mo.pdf.

Vacuum Relief Valves, Design Sheet, A-205, A-207, A-207-MO, Revision 4.0, 2002 Midland Manufacturing Corp., Jan. 8, 2004, 1 page, http://www.midlandmfg.net/documents/midland/documents/datasheets/a-205-a-207-a-207- mo.pdf.

Vacuum Relief Valves, Design Sheet, A-209-S, A-209-WS, Revision 4.0, 2002 Midland Manufacturing Corp., Mar. 14, 2002, 1 page, http://www.midlandmfg.net/documents/midland/documents/datasheets/a-209-s-a-209-ws.pdf.

Vacuum Relief Valves, Flanged—Weather Cap Design Sheet A-222-W-RS, Revision 4.0, 2002 Midland Manufacturing Corp., Nov. 17, 2004, 1 page, http://www.midlandmfg.net/documents/midland/documents/datasheets/a-222-w-rs. pdf.

Vacuum Relief Valves Design Sheet, A-220-W-NS & A-222-W-NS, Revision 4.0, 2002 Midland Manufacturing Corp., Oct. 2, 2005, 1 page, http://www.midlandmfg.net/documents/midland/documents/datasheets/a-220-w-ns-a-222-w-ns.pdf.

Vacuum Relief Valves, Design Sheet, A-220-W, A-222-W, Revision 4.0, 2002 Midland Manufacturing Corp., Feb. 10, 2004, 1 page, http://www.midlandmfg.net/documents/midland/documents/datasheets/a-220-w-a-222-w.pdf.

"Do Your Part! Help Eliminate Non-Accident Releases (NARs)", Vacuum Relief Valve Information Sheet, Feb. 2009, Salco Products, Inc., pp. 1-2.

* cited by examiner

US 8,347,911 B2

VACUUM RELIEF VALVE AND METHOD FOR ASSEMBLING THE SAME

BACKGROUND OF THE INVENTION

The embodiments described herein relate generally to vacuum relief valves and, more particularly, to vacuum relief valves for use with railcars.

Known vacuum relief valves are coupled to containers, such as a tank or tanker car (i.e., a truck tanker car or a railcar tanker car), for relieving a vacuum formed within the container. The vacuum is typically caused by pressure and/or temperature changes that occur within the container. When a vacuum forms in the container, the vacuum (i.e., the pressure difference) exerts a force on a stem of the relief valve that causes the stem to move and the valve to open. Air from outside the container is then allowed to enter the container through the valve to relieve the vacuum (i.e., to equalize the pressure difference between the inside of the container and the outside of the container).

At least some known vacuum relief valves are "step" type vacuum relief valves that enable an operator to push downward on a top of the valve to relieve a vacuum within a container. However, at least some known step type vacuum relief valves can be accidentally depressed, which may allow materials other than air to enter and/or exit the container through the valve. Further, at least some known step type vacuum relief valves include a seat located generally midway between a top and a bottom of the valve.

At least some other known vacuum relief valves are "no-step" type vacuum relief valves that cannot be manually operated while coupled to a container. Some known no-step vacuum relief valves include a flanged connection and a seat that is positioned generally midway between a top and a bottom of the valve. Further, such known vacuum relief valves vent air through a top of a body of the valve.

In both types of known vacuum relief valves, the seat and/or a seal positioned on the seat is accessed by disassembling the valve because of the midway location of the seat. Such known vacuum relief valves are serviced, inspected, and/or repaired, by removing the valve from the container and disassembling the valve. When these types of known vacuum relief valves are disassembled while still coupled to the container, it is possible that the stem can become uncoupled from the valve and fall into the container causing the material stored within the container to be contaminated.

Accordingly, it is desirable to provide a vacuum relief valve that can be inspected, including inspecting the valve seat and seal area, without removing the valve from the container. Such inspections allow users to confirm that the valve is seating properly and that no material has accidentally leaked from the container. It is also desirable to provide a vacuum relief valve that can be serviced, including replacing seals in the valve seat area, without having to disassemble the valve. By avoiding valve disassembly, the risk of uncoupling the valve stem so that it falls into the container can be reduced. Further, it is desirable to provide a vacuum relief valve that has tamper resistant and/or tamper evident features to insure that contents of the container have not been contaminated and/or accidentally released.

BRIEF DESCRIPTION OF THE INVENTION

In one aspect, a vacuum relief valve is provided. The vacuum relief valve includes a body having a side wall, and a stem that is movable with respect to the body between an open position and a closed position. The stem is biased in the closed position. The vacuum relief valve further includes a first sight glass coupled to the body and configured to enable visual inspection of a sealing area of the vacuum relief valve. The sealing area includes at least a portion of said stem.

In another aspect, a railcar is provided. The railcar includes a container and a vacuum relief valve coupled to the container. The vacuum relief valve includes a body having a side wall, and a stem that is movable with respect to the body between an open position and a closed position. The stem is biased in the closed position. The vacuum relief valve further includes a first sight glass coupled to the body and configured to enable visual inspection of a sealing area of the vacuum relief valve. The sealing area includes at least a portion of said stem.

In yet another aspect, a method for assembling a vacuum relief valve is provided. The vacuum relief valve includes a body having a side wall, and a stem that is movable with respect to the body between an open position and a closed positioned. The stem is biased in the closed position. The vacuum relief valve further includes at least one sight glass configured to enable visual inspection of a sealing area of the vacuum relief valve. The method includes inserting the stem through a stem collar of the body such that a seat of the stem is positioned adjacent a bottom surface of the body when the stem is in the closed position, and coupling the at least one sight glass to the body at a location for the visual inspection of the sealing area.

The embodiments described herein include at least one sight glass that enables visual inspection of a vacuum relief valve while coupled to a container.

BRIEF DESCRIPTION OF THE DRAWINGS

FIG. 1 is a side view of an exemplary tanker railcar.

FIG. 2 is a perspective view of an exemplary vacuum relief valve that may be used with the railcar shown in FIG. 1.

FIG. 3 is schematic cross-sectional view of the vacuum relief valve shown in FIG. 2.

FIG. 4 is a top view of the vacuum relief valve shown in FIG. 2.

FIG. 5 is a side view of an exemplary stem that may be used with the vacuum relief valve shown in FIG. 2.

FIG. 6 is cross-sectional view of an exemplary valve body that may be used with the vacuum relief valve shown in FIG. 2.

FIG. 7 is a cross-sectional view of an alternative embodiment of a vacuum relief valve that may be used with the railcar shown in FIG. 1.

FIG. 8 is a cross-sectional view of a second alternative embodiment of a vacuum relief valve that may be used with the railcar shown in FIG. 1.

DETAILED DESCRIPTION OF THE INVENTION

The embodiments of a vacuum relief valve described herein facilitate enabling an operator to visually inspect internal workings of the vacuum relief valve and/or identify potential leak concerns without removal and/or disassembly of the vacuum relief valve. More specifically, by including at least one sight glass coupled to a body of the vacuum relief valve, the embodiments described herein enable the operator to view a sealing area of the vacuum relief valve including at least a stem, a seat, and a seal while the vacuum relief valve is coupled to the container. Moreover, the embodiments described herein include the seat and/or seal ring positioned adjacent a bottom of the vacuum relief valve. Such seat and/or seal ring placement allows the operator to remove and/or replace the seal ring without disassembly of the vacuum relief valve, reducing time and cost associated with servicing the seal ring.

In the exemplary embodiment, the vacuum relief valve includes two sight glasses that enable light to be directed through a first sight glass while performing a visual inspection through a second sight glass. Further, the stem seat described herein includes a projection at a bottom thereof for enabling the seal ring to be removed and/or replaced without disassembling the vacuum relief valve. More specifically, by pulling on the projection, the stem is extended out of the valve body for facilitating access to the seal ring. The seal ring can be stretched over the seat for removal or attachment. The stem further includes a retention device that prevents the stem from accidentally falling into the container when the vacuum relief valve is at least partially disassembled while still coupled to the container.

Figure 7:
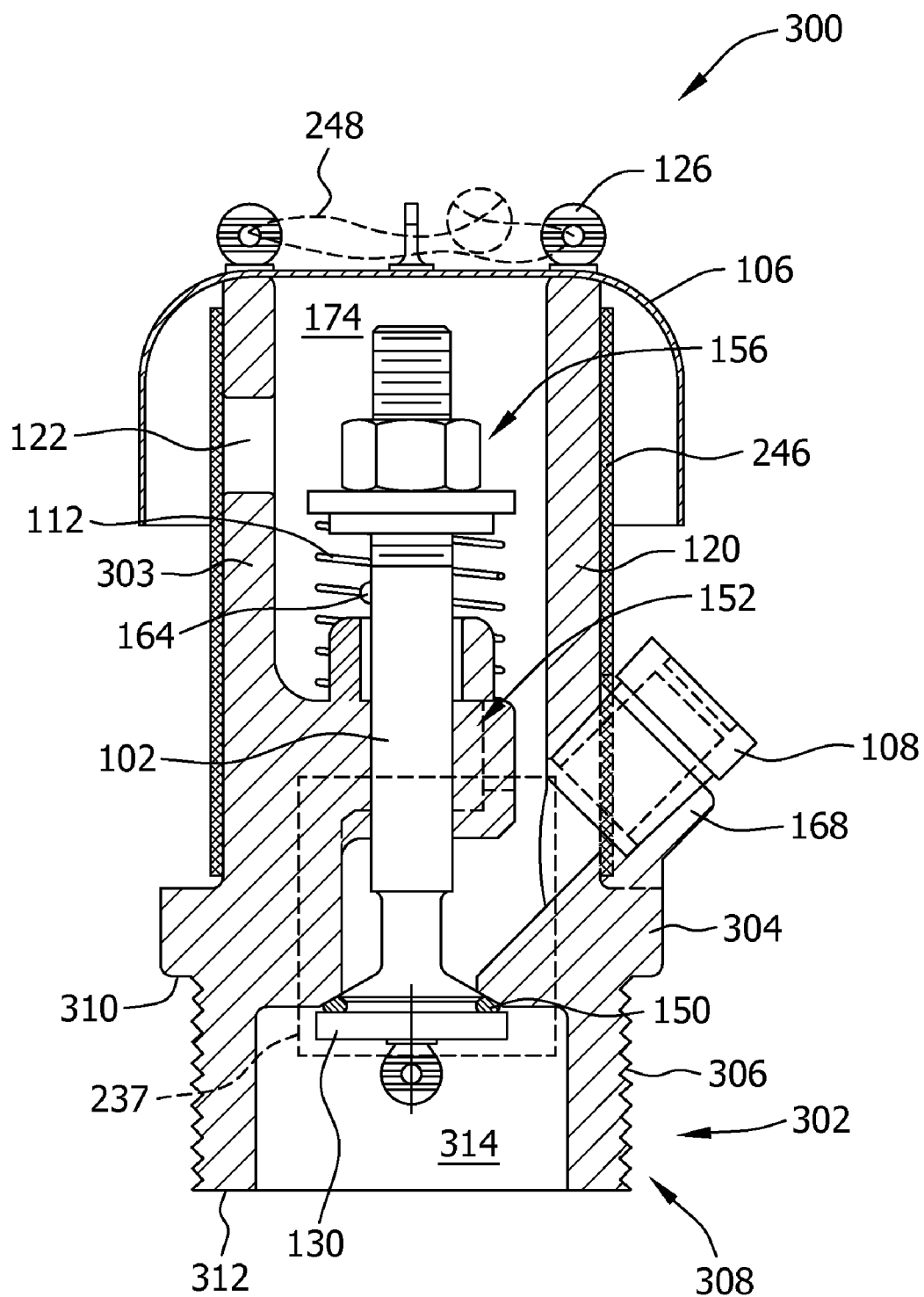
Figure 8:
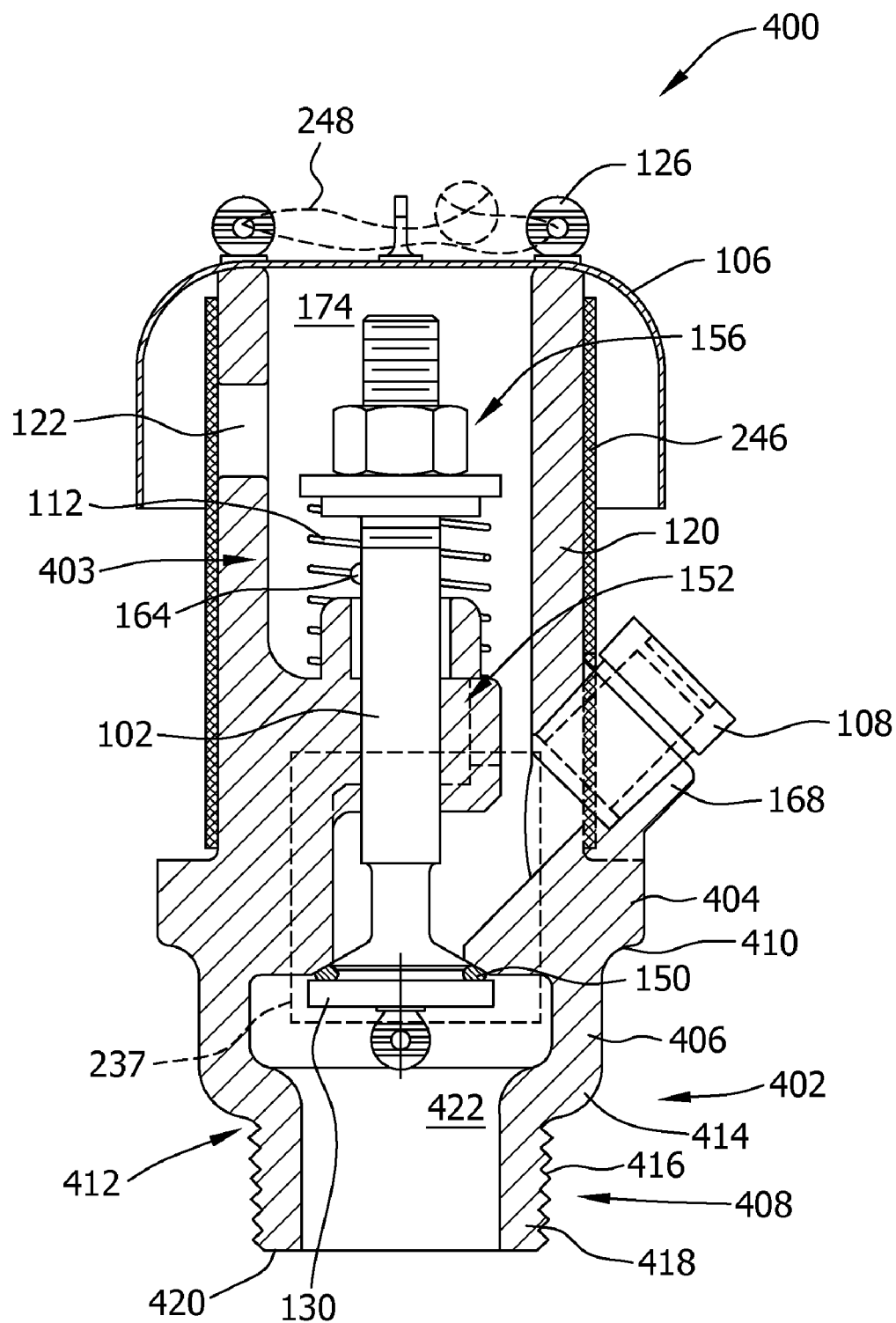

Further, the embodiments described herein includes tamper evident and/or tamper resistant features, such as a no-step type design, a car seal, a screen covering vent openings, and tack welds. A cycle time of the vacuum relief valve described herein can be adjusted by selecting and/or biasing a spring of the valve to have a higher pressure setting. Further, the embodiments described herein are described as being coupled to a tanker railcar, however, it should be understood that the embodiments described herein can also be used with a differential pressure railcar and/or any other suitable container. Moreover, while a flanged vacuum relief valve is described herein, it should be understood that many of the features can also be used with a threaded vacuum relief valve, as shown in FIGS. 7 and 8. Additionally, the features of the vacuum relief valve described herein, such as safety valves, bottom outlet valve, pressure relief valves, and/or any other suitable type of valve.

Figure 1:
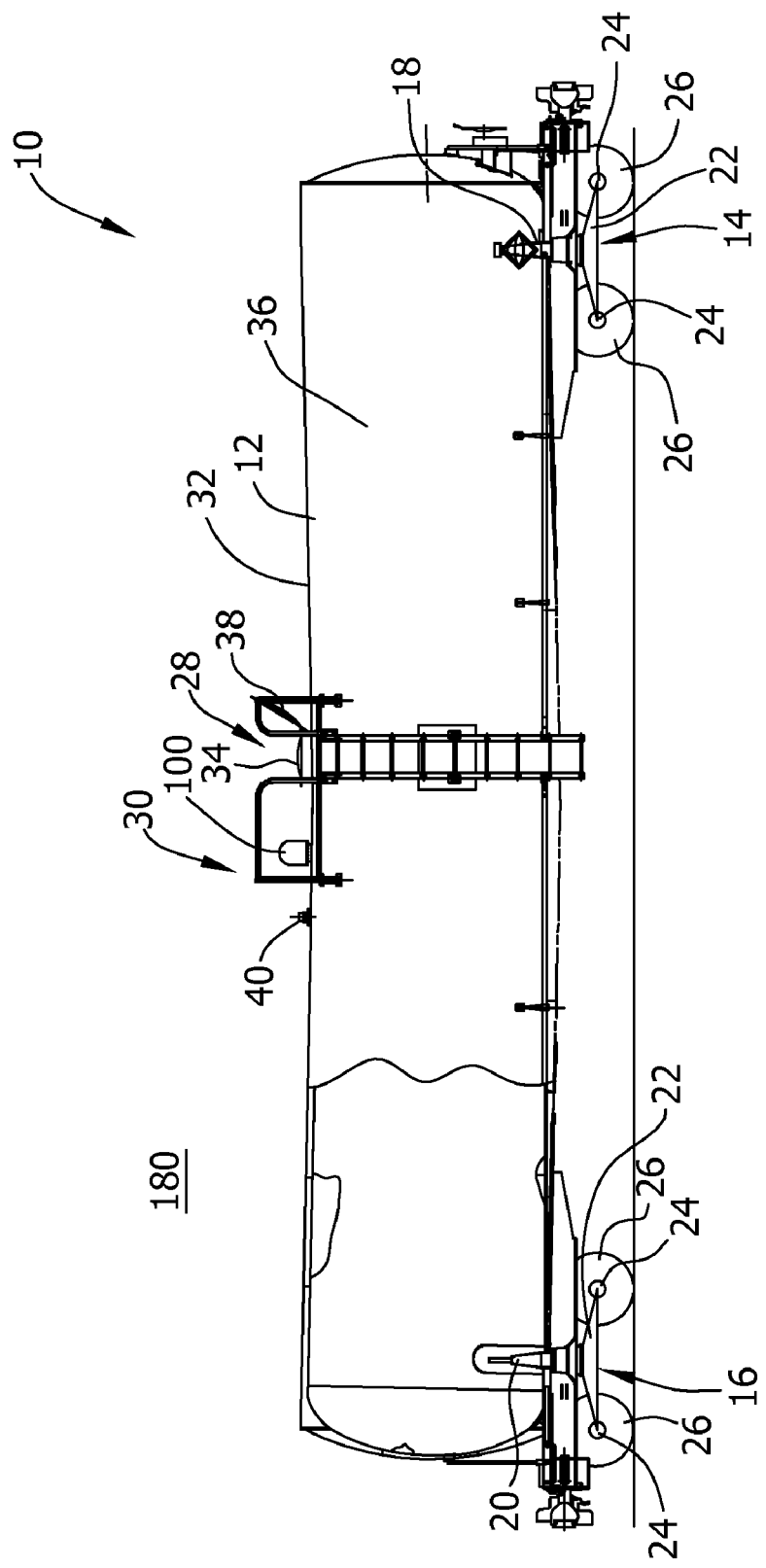
FIGS. 1-8 show exemplary embodiments of the apparatus described herein.

FIG. 1 is a side view of an exemplary tanker railcar 10. Railcar 10 can be used to store and/or transport materials, such as vegetable oil, sulfuric acid, hydrochloric acid, a commodity, and/or any other suitable material in gas, solid, and/or liquid state. In the exemplary embodiment, railcar 10 is configured to withstand a vacuum pressure of at least approximately 4 pounds per square inch (psi). Alternatively, railcar 10 is configured to withstand a vacuum pressure of at least 1 psi.

Railcar 10 includes a container or tank 12, a front sill assembly 14, and a rear sill assembly 16. Sill assemblies 14 and 16 are coupled to tank 12. Bolster assemblies 18 and 20 are configured to stabilize tank 12 on sill assemblies 14 and 16. More specifically, front bolster assembly 18 is coupled to tank 12 and front sill assembly 14, and rear bolster assembly 20 is coupled to tank 12 and rear sill assembly 16. Each sill assembly 14 and 16 includes a truck 22 having a pair of axles 24 each coupled to a pair of wheels 26. Tank 12 includes at least one hatch or manway 28 and a fittings arrangement 30 at a top 32 of tank 12. Manway 28 includes an opening 34 through a wall 36 of tank 12 that is sealable using a cover 38. Manway 28 enables tank 12 to be filled with a material, such as a commodity, and for the material to be sealed within tank 12 during transport. Fittings arrangement 30 includes fittings of railcar 10 such as, but not limited to, a blind flange, a plugged hole, a safety valve 40, and a vacuum relief valve 100.

In the exemplary embodiment, tank 12 includes vacuum relief valve 100 coupled thereto. Vacuum relief valve 100 is coupled to tank 12 to automatically relieve a vacuum formed within tank 12 due to pressure changes within tank 12. For example, the vacuum within tank 12 may be caused by temperature changes of material within tank 12. In the exemplary embodiment, vacuum relief valve 100 is configured to open at ¾ psi, 2 psi, and/or 3 psi. In other words, vacuum relief valve 100 has a pressure setting of ¾ psi, 2 psi, and/or 3 psi. By adjusting the pressure setting of vacuum relief valve 100, a cycle time of vacuum relief valve 100 can be altered. For example, by reducing the pressure setting of vacuum relief valve, the cycle time of vacuum relief valve 100 is reduced such that vacuum relief valve 100 opens more frequently.

Vacuum relief valve 100 is a no-step type valve that is not opened by applying a force to a top of vacuum relief valve 100. As such, vacuum relief valve 100 is not usually opened accidentally, for example, when a force is accidentally applied to an outer surface of vacuum relief valve 100 by a human operator and/or any other object. Because vacuum relief valve 100 cannot be opened by applying a force to the top of vacuum relief valve 100, vacuum relief valve 100 is also tamper resistant, as described in more detail below.

Railcar 10 includes one vacuum relief valve 100 in the exemplary embodiment, however, railcar 10 can include any suitable number of vacuum relief valves 100. Further, in the exemplary embodiment, vacuum relief valve 100 is located on or near manway 28. Alternatively, vacuum relief valve 100 is coupled to tank 12 at any suitable location that enables vacuum relief valve 100 to function as described herein, such as near a nozzle assembly.

To manufacture tanker railcar 10, tank 12, bolster assemblies 18 and 20, and sill assemblies 14 and 16 are assembled. More specifically, bolster assemblies 18 and 20 and sill assemblies 14 and 16 are welded to tank 12. Bolster assemblies 18 and 20 and sill assemblies 14 and 16 are then rested on trucks 22. Vacuum relief valve 100 is coupled to tank 12 by forming an aperture 42 (shown in FIG. 3) through tank 12, positioning a gasket 44 (shown in FIG. 3) about aperture 42, and coupling vacuum relief valve 100 to tank 12 and gasket 44 using mechanical fasteners, such as bolts 258 (shown in FIG. 3).

Figure 2:
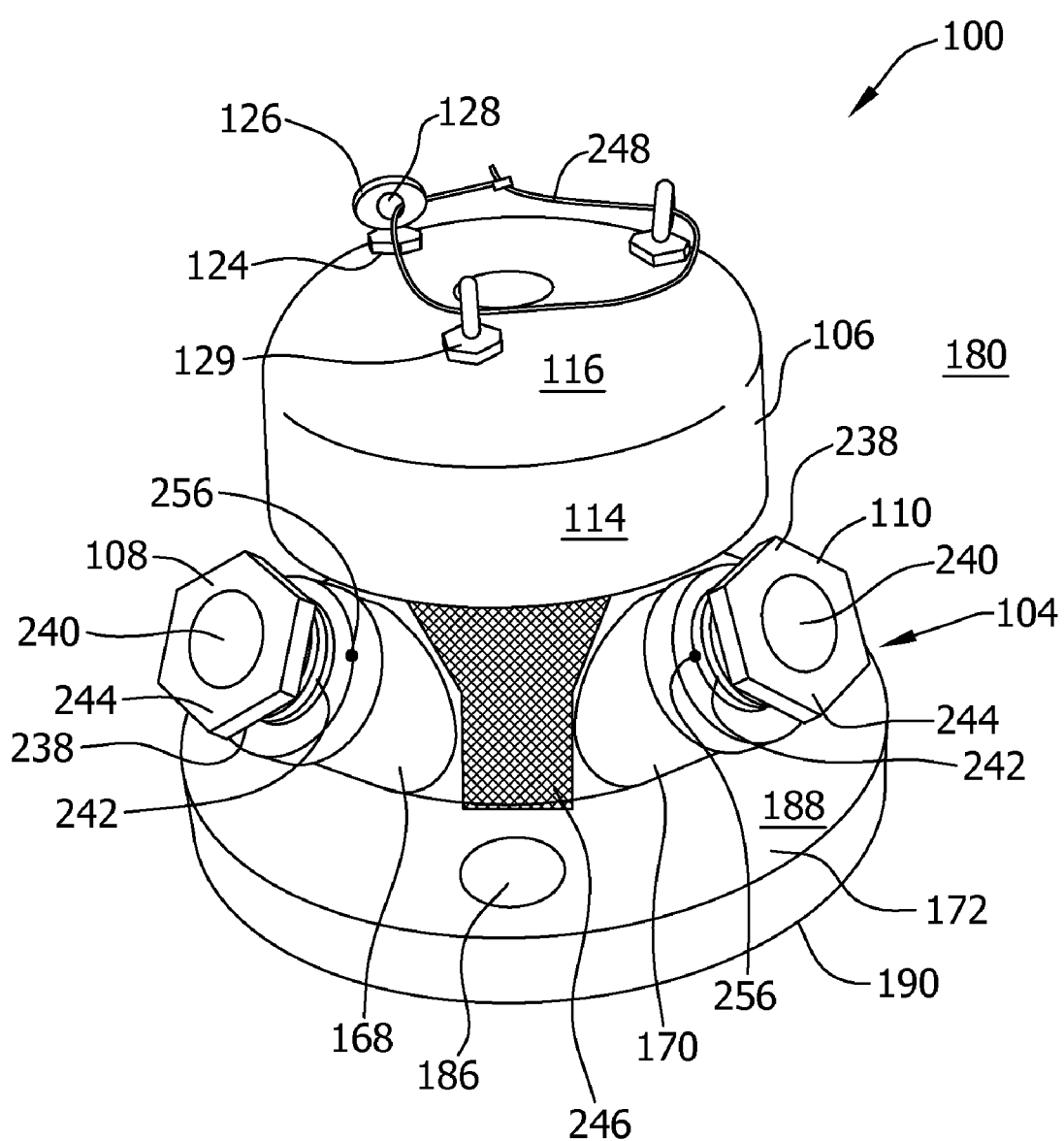
Figure 3:
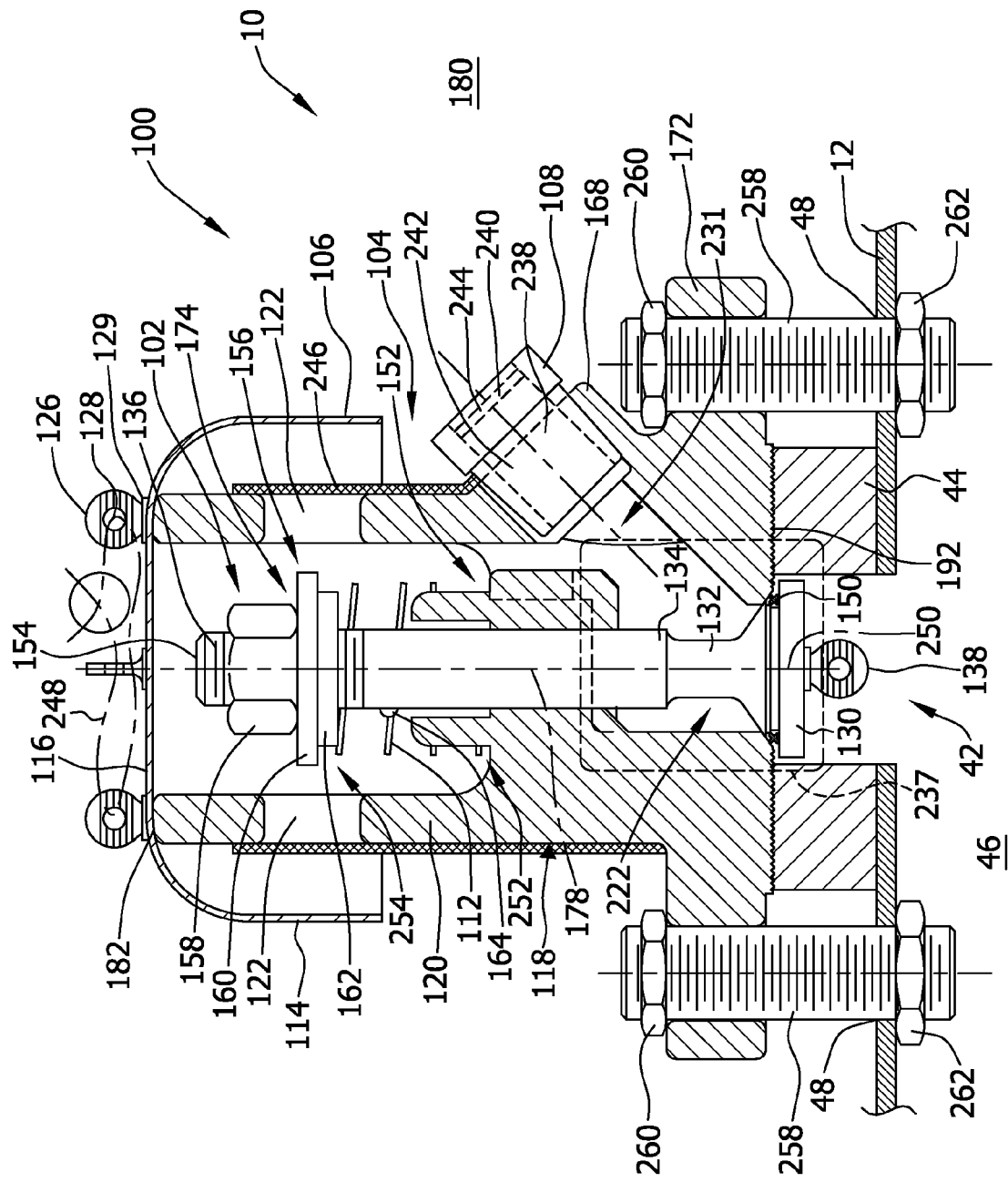
Figure 4:
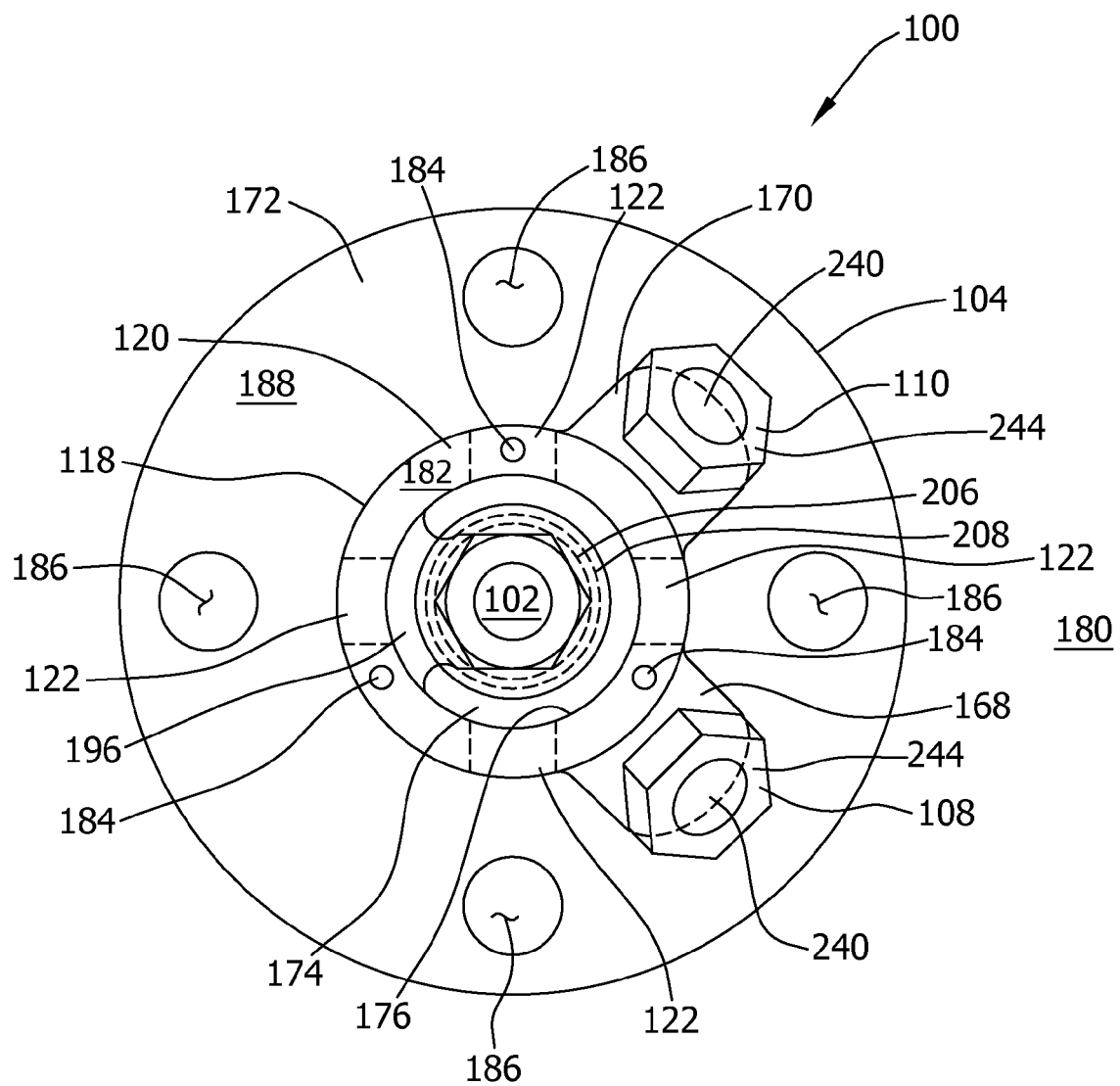
Figure 5:
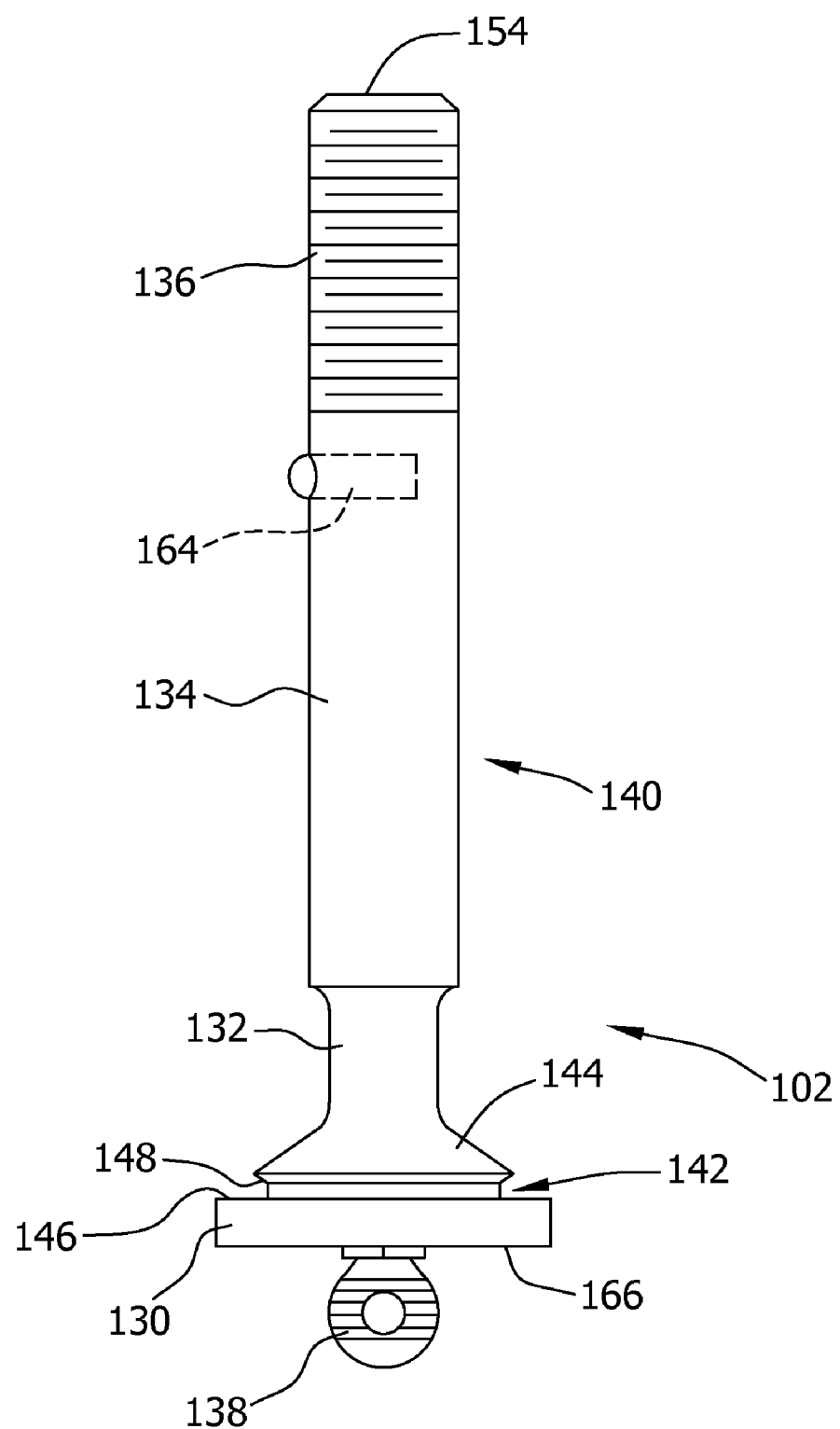
Figure 6:
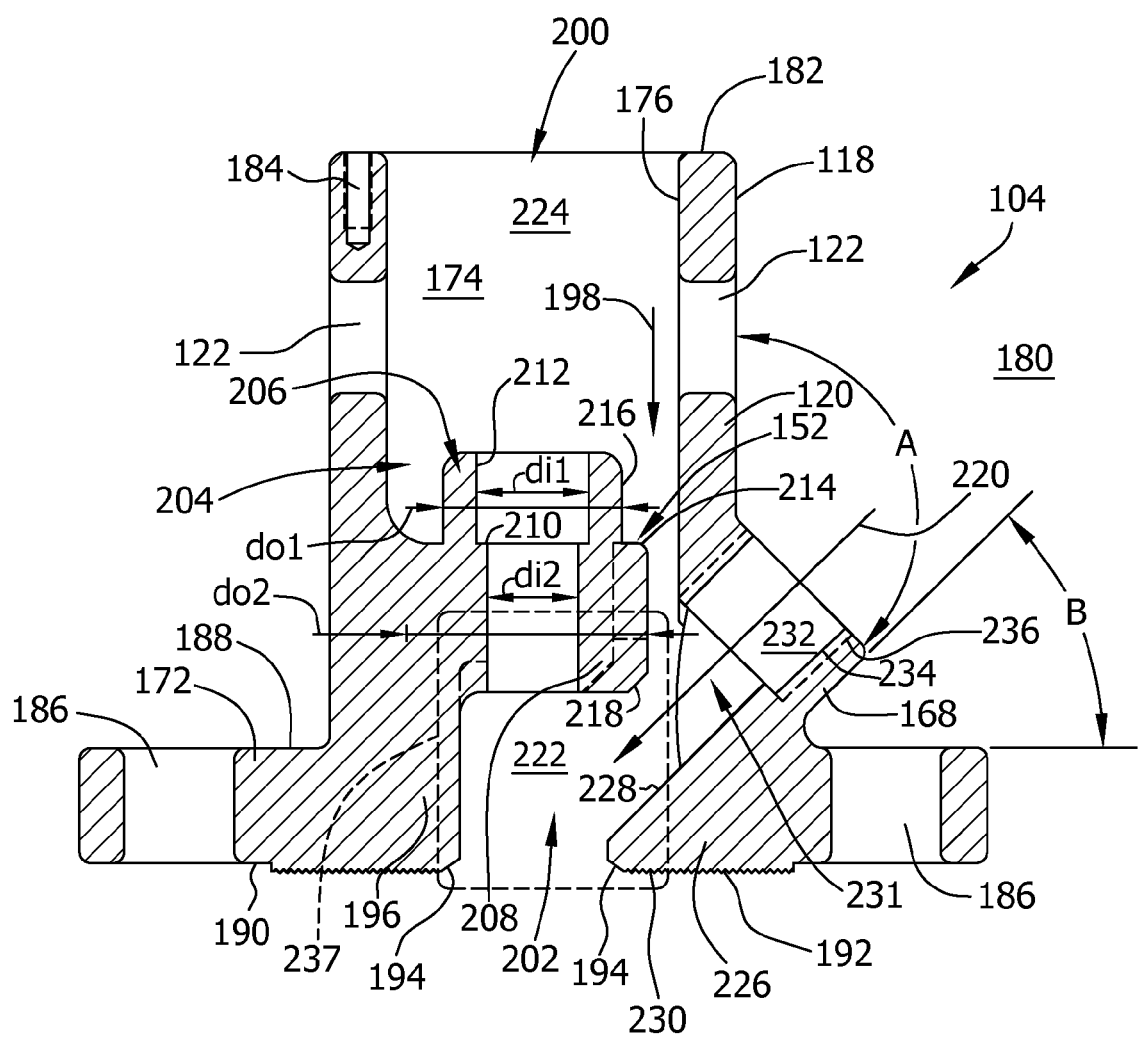

FIG. 2 is a perspective view of vacuum relief valve 100 that may be used with railcar 10 (shown in FIG. 1). FIG. 3 is schematic cross-sectional view of vacuum relief valve 100 as coupled to railcar 10. FIG. 4 is a top view of vacuum relief valve 100 with a hood 106 removed. FIG. 5 is a side view of an exemplary stem 102 that may be used with vacuum relief valve 100. FIG. 6 is cross-sectional view of an exemplary body 104 that may be used with vacuum relief valve 100.

In the exemplary embodiment, vacuum relief valve 100 is fabricated from carbon steel, stainless steel, and/or glass. Vacuum relief valve 100 includes stem 102, body 104, hood 106, and sight glasses 108 and 110. More specifically, stem 102, hood 106, and sight glasses 108 and 110 are coupled to body 104, and body 104 is coupled to railcar 10. Further, in the exemplary embodiment, vacuum relief valve 100 includes a spring 112 coupled to stem 102 and body 104. Spring 112 is selected to achieve a desired pressure setting of vacuum relief valve 100. For example, when a higher pressure setting is desired, a stronger spring is used within vacuum relief valve 100.

Referring to FIGS. 2-4, hood 106 has a bowl shape including a substantially cylindrical side wall 114 and a generally planar top wall 116. Side wall 114 is sized to circumferentially extend about an outer surface 118 of a side wall 120 of body 104 at a distance therefrom. Further, hood side wall 114 extends downwardly to at least partially conceal a vent opening 122 defined through body side wall 120. Top wall 116 includes a plurality of apertures 124 defined therethrough. A hood fastener 126 is inserted through each aperture 124 to couple hood 106 to body 104. Each hood fastener 126 includes, in the exemplary embodiment, an opening 128 defined therethrough and a shoulder 129. In the exemplary embodiment, shoulder 129 is formed unitarily with hood faster 126. Alternatively, shoulder 129 may be defined by a nut that is separate from hood fastener 126. When assembled using hood fastener 126, hood 106 is stationary with respect to body 104 such that vacuum relief valve 100 is not opened when a force is applied downwardly to hood 106. As such, vacuum relief valve 100 is a no-step type vacuum relief valve.

Referring to FIGS. 3 and 5, stem 102 includes a seat 130, a neck 132, a sliding portion 134, a threaded portion 136, and a gripping projection 138. In the exemplary embodiment, seat 130, neck 132, sliding portion 134, and threaded portion 136 are formed unitarily as one piece to define a main portion 140, and gripping projection 138 is coupled to main portion 140. Alternatively, gripping projection 138 is formed unitarily as one piece with main portion 140. In the exemplary embodiment, a seal channel 142 is defined between neck 132 and seat 130 at a generally conical portion 144 that widens from neck 132 to seat 130. Seal channel 142 is at least partially defined by an upper surface 146 of seat 130 and a lower surface 148 of conical portion 144 and is configured to retain a seal ring 150 therein. Seal ring 150 is, in the exemplary embodiment, a quad ring, however, seal ring 150 is any suitable seal that enables vacuum relief valve 100 to function as described herein, for example, seal ring 150 is alternatively an O-ring.

Sliding portion 134 is, in the exemplary embodiment, a substantially smooth cylinder configured to slide within a stem collar 152 of body 104. Alternatively, sliding portion 134 has any suitable shape, texture, and/or configuration that enables vacuum relief valve 100 to function as described herein. For example, sliding portion 134 has a shape that corresponds to a shape of stem collar 152. In the exemplary embodiment, threaded portion 136 extends upward from sliding portion 134 to a top 154 of stem 102. Threaded portion 136 is configured to have an upper spring stop 156 coupled thereto.

Referring to FIG. 3, in the exemplary embodiment, upper spring stop 156 includes a nut 158, a washer 160, and a seat 162. Seat 162 is sized to be inserted into spring 112. Washer 160 and seat 162 are formed unitarily as one-piece and is positioned between nut 158 and spring 112 when upper spring stop 156 is assembled on stem 102. In the exemplary embodiment, position of upper spring stop 156 with respect to stem 102 is adjustable by rotating nut 158 to a desired position. As such, upper spring stop 156 is an adjustable spring stop. In an alternative embodiment, threaded portion 136 is not threaded depending on a configuration of upper spring stop 156. For example, if upper spring stop 156 does not include nut 158 but, rather, includes an alternative fastener, such as a cotter pin, threaded portion 136 is not required to include threads.

Referring again to FIGS. 3 and 5, in the exemplary embodiment, stem 102 further includes a retention device 164 coupled thereto. Retention device 164 is configured to retain stem 102 within body 104 when upper spring stop 156 is removed from stem 102. Retention device 164 is, for example, a spring-loaded ball coupled within sliding portion 134 of stem 102. In a particular embodiment, retention device 164 is a detent pin. Alternatively, retention device 164 is any suitable type of device located at any suitable position with respect to stem 102 that enables vacuum relief valve 100 to function as described herein. Further, in the exemplary embodiment, gripping projection 138 is configured to enable an operator to pull stem 102 at least partially from body 104 to access at least seal ring 150. In a particular embodiment, gripping projection 138 is a thumb screw coupled within an aperture (not shown) defined in a bottom surface 166 of main portion 140 and/or seat 130. Alternatively, gripping projection 138 is any suitable projection or portion that enables vacuum relief valve 100 to function as described herein.

Referring to FIGS. 2-4 and 6, body 104 includes side wall 120, sight ports 168 and 170, a flange 172, and stem collar 152. Side wall 120, flange 172, and stem collar 152 are formed unitarily as one piece, and sight ports 168 and 170 are coupled to side wall 120 and/or flange 172. Alternatively, sight ports 168 and/or 170 are formed unitarily as one piece with side wall 120, flange 172, and/or stem collar 152. As another alternative, any of side wall 120, flange 172, stem collar 152, and/or sight ports 168 and/or 170 is formed as a separate component and coupled to another component. In an alternative embodiment, rather than including flange 172, body 104 includes a threaded connection (not shown) that is configured to be coupled to tank 12. Further, although two sight ports 168 and 170 are described herein, body 104 can include any suitable number of sight ports.

In the exemplary embodiment, body side wall 120 is substantially cylindrical and defines a chamber 174 therein. More specifically, an inner surface 176 of side wall 120 defines chamber 174. Chamber 174 has a centerline 178 that extends substantially parallel to inner surface 176 and/or outer surface 118 of side wall 120. At least one vent opening 122 is defined through side wall 120 and extends through outer surface 118 and inner surface 176 to provide flow communication between chamber 174 and a surrounding environment 180. In the exemplary embodiment, body 104 includes four vent openings 122, however, body 104 can include any suitable number of vent openings 122. Further, in the exemplary embodiment, vent openings 122 are located at a distance from a top 182 of side wall 120. The distance enables hood fasteners 126 to extend into apertures 184 defined in top 182 of side wall 120 without intersecting vent openings 122. When assembled, hood side wall 114 is located at a distance from vent openings 122 that enables substantially uninhibited flow between chamber 174 and environment 180 through body side wall 120.

Flange 172 extends substantially perpendicularly from side wall 120 and includes at least one bolt hole 186 defined therethrough. More specifically, an upper surface 188 and a lower surface 190 of flange 172 are each substantially perpendicular to at least outer surface 118 of side wall 120. Alternatively, upper surface 188 and/or lower surface 190 is at any suitable angle to outer surface 118 of side wall 120. In the exemplary embodiment, lower surface 190 of flange 172 includes a gasket surface 192 configured to contact gasket 44. In a particular embodiment, gasket surface 192 is spiral ground, however, gasket surface 192 can include any suitable texture and/or configuration that enables vacuum relief valve 100 to function as described herein. Further, in the exemplary embodiment, an edge 194 between lower surface 190 and inner surface 176 is configured to contact and/or engage seal ring 150. For example, edge 194 is at an angle that facilitates air-tight contact between seal ring 150 and body 104.

In the exemplary embodiment, stem collar 152 extends from inner surface 176 of side wall 120 into chamber 174. More specifically, stem collar 152 includes a support 196 that extends from inner surface 176. Stem collar 152 is positioned such that chamber 174 extends from top 182 of side wall 120 to lower surface 190 of flange 172 and has at least one generally unobstructed flow path 198 from a top 200 of chamber 174 to a bottom 202 of chamber 174. For example, a middle portion 204 of chamber 174 is generally C-shaped about stem collar 152, as shown in FIG. 4.

Stem collar 152 includes a spring seat 206 and a stem portion 208. Spring seat 206 has a first inner diameter di1 and a first outer diameter do1, and stem portion 208 has a second inner diameter di2 and a second outer diameter do2. When stem 102 and/or stem collar 152 is other than cylindrically shaped, spring seat 206 and stem portion 208 have widths rather than diameters. In the exemplary embodiment, first inner diameter di1 is larger than second inner diameter di2, and first outer diameter do1 is smaller than second outer diameter do2. As such, a lip 210 is defined along an inner surface 212 of stem collar 152 between spring seat 206 and stem portion 208. Further, a spring shoulder 214 is defined at least partially along an outer surface 216 of stem collar 152 between spring seat 206 and stem portion 208. A lower edge 218 of stem portion 208 is angled at least proximate sight ports 168 and 170 to prevent stem collar 152 from interfering with a line of sight 220 through each of sight ports 168 and 170.

Support 196 extends into a lower portion 222 of chamber 174 to edge 194 such that lower portion 222 is narrower than an upper portion 224 of chamber 174. Further, body 104 includes an annular ridge 226 that extends from flange 172 and/or sight port 168 and/or 170 into chamber lower portion 222. Edge 194 at least partially defines ridge 226. Ridge 226 has an angled upper surface 228 that corresponds at least to an angle of line of sight 220, and a bottom surface 230 that at least partially defines gasket surface 192. In one embodiment, upper surface 228 is substantially parallel to line of sight 220 and/or edge 218.

Sight ports 168 and 170 extend from side wall 120 and/or ridge 226 such that ridge upper surface 228 at least partially forms an inner surface 232 of sight port 168 and/or 170. In the exemplary embodiment, sight ports 168 and 170 each define a port opening 231 extending through side wall 120. Inner surface 232 of each of sight ports 168 and 170 includes a threaded portion 234 that is configured to engage a respective sight glass 108 or 110. Inner surface 232 defines line of sight 220. An upper surface 236 of sight ports 168 and/or 170 is at an angle A to side wall outer surface 118 and an angle B to flange upper surface 188. Angles A and/or B are selected such that an operator can view a sealing area 237 of vacuum relief valve 100 through sight port 168 and/or 170. Although in the exemplary embodiment sight ports 168 and 170 are at the same angles A and B to side wall 120, it should be understood that sight port 168 and sight port 170 may be at different angles to side wall 120. Sealing area 237 includes, in the exemplary embodiment, chamber lower portion 222, seal ring 150, seat 130, and/or neck 132. In the exemplary embodiment, sight ports 168 and 170 are positioned with respect to body 104 such that light can be directed through a first sight port 168 for viewing sealing area 237 through a second sight port 170. Further, sight ports 168 and 170 are positioned such that by alternately looking through first sight port 168 and second sight port 170, an operator can view 360° about stem 102, within sealing area 237.

Referring to FIGS. 2-4, a sight glass 108 or 110 is coupled within each respective sight port 168 or 170. More specifically, first sight glass 108 is coupled within first sight port 168, and second sight glass 110 is coupled within second sight port 170. In the exemplary embodiment, each sight glass 108 and 110 includes a metal body 238 and a transparent disk 240. More specifically, each sight glass 108 and 110 is formed from steel with glass fused thereto, however, any suitable material that can withstand temperatures, pressure, and/or chemical compositions of materials that may be stored within tank 12 can be used for forming sight glass 108 and/or 110. In the exemplary embodiment, body 238 includes a threaded portion 242 and a nut portion 244. As an alternative to nut portion 244, sight glass 108 and/or 110 includes a portion that is configured to be engage by a tool. In the exemplary embodiment, disk 240 is coupled within nut portion 244, however, disk 240 is coupled at any suitable location within sight glass 108 and/or 110 that enables vacuum relief valve 100 to function as described herein.

In the exemplary embodiment, vacuum relief valve 100 further includes a screen 246 coupled about body 104. Screen 246 is removable from body 104 and able to be cleaned and replaced on body 104. Screen 246 is configured to prevent contaminates and/or debris from entering chamber 174 through vent openings 122, prevent material from exiting tank 12 through vent openings 122, and/or allow air to enter chamber 174 from surrounding environment 180. In a particular embodiment, screen 246 is formed from a fine metal mesh and/or finely perforated cylindrical sheet of material. In the exemplary embodiment, screen 246 is positioned adjacent to and/or in direct contact with side wall outer surface 118, however, screen 246 can be positioned within chamber 174 adjacent to and/or in direct contact with side wall inner surface 176. Further, in the exemplary embodiment, screen 246 is configured to fit around sight ports 168 and/or 170. When assembled to body 104, screen 246 can prevent tampering with vacuum relief valve 100 by preventing access to vent openings 122, especially when combined with a tamper resistant device 248. When screen 246 is missing and/or damaged, screen 246 provides visual evidence of tampering. As such, screen 246 is a tamper resistance and/or tamper evident feature of vacuum relief valve 100.

In the exemplary embodiment, when hood 106 is coupled to body 104, tamper resistant device 248, such as a car seal, is coupled through openings 128 of hood fasteners 126. Alternatively, tamper resistant device 248 is coupled to hood 106, hood fasteners 126, and/or screen 246 coupled to body 104. Tamper resistant device 248 is configured to evidence that vacuum relief valve 100 has been tampered with or serviced. For example, if tamper resistant device 248 is broken, missing, and/or damaged, hood 106 may have been removed or attempted to have been removed from body 104. By removing hood 106 from body 104, an operator can access a flow communication path to materials within tank 12. In the exemplary embodiment, tamper resistant device 248 is a plastic fastening member, such as a zip-tie, a metal fastening member, such as a chain or cable, a composite fastening member, and/or any other suitable fastening member that enables tamper resistant device 248 to function as described herein.

Referring to FIGS. 2-6, to manufacture and/or assemble vacuum relief valve 100, seal ring 150 is coupled to stem 102 by inserting seal ring 150 within channel 142. When gripping projection 138 is separate from main portion 140, gripping portion 138 is coupled to main portion 140. Retention device 164 is inserted into stem 102.

Threaded portion 136 of stem 102 is then inserted through stem collar 152 from bottom 202 of chamber 174 toward top 200 of chamber 174. When assembled in body 104, a centerline 250 of stem 102 is substantially collinear with centerline 178 of chamber 174. From top 200 of chamber 174, spring 112 is slid onto stem 102 and spring seat 206 of body 104. More specifically, a lower end 252 of spring 112 circumscribes spring seat 206 and rests against spring shoulder 214. Seat 162 is positioned about stem 102 at an upper end 254 of spring 112, washer 160 is positioned against seat 162, and nut 158 is threaded onto stem 102 to secure upper spring stop 156 in place. In the exemplary embodiment, a position of nut 158 with respect to stem 102 is adjusted to achieve a desired biasing force of spring 112 against stem 102. When biased into a closed position, stem seat 130 and/or seal ring 150 is in direct contact with lower surface 190 and/or bottom edge 194 of body 104 to provide an air-tight seal between chamber 174 and an interior 46 of tank 12. When assembled, stem 102 is movable with respect to body 104 from the closed position to an open position.

Sight glasses 108 and 110 are inserted into sight ports 168 and 170, respectively, and coupled thereto using threads and/or any other suitable fastening technique. Sight glasses 108 and 110 are then tacked welded to body 104. Tack welds 256 prevent access to chamber 174 of vacuum relief valve 100 by securing sight glasses 108 and 110 to body 104 and by providing evidence of tampering with and/or removal of sight glass 108 and/or 110. For example, when tack weld 256 is missing and/or damaged, sight glass 108 and/or 110 has been removed from vacuum relief valve 100. As such, tack welds 256 are a tamper resistant and/or tamper evident feature of vacuum relief valve 100.

Screen 246 is slid over body 104 from top 182 of side wall 120. Hood 106 is then coupled to body 104 using hood fasteners 126. More specifically, hood fasteners 126 are inserted through hood apertures 124 into body apertures 184 and tightened to secure hood 106 to body 104. When assembled, hood 106 is in direct contact with top 182 of side wall 120 to substantially prevent air and/or materials from entering and/or exiting chamber 174 through top 200 of chamber 174. As such, vent opening 122 and/or bottom 202 of chamber 174 provide flow communication between tank 12 and environment 180. When assembled, hood 106 is substantially fixed with respect to body 104. Further, in the exemplary embodiment, tamper resistant device 248 is threaded through, and/or otherwise coupled to, hood fastener opening 128 and/or screen 246 to prevent disassembly of vacuum relief valve 100.

To couple vacuum relief valve 100 to railcar 10, aperture 42 is formed through tank 12, and gasket 44 is positioned about aperture 42. Vacuum relief valve 100 is then positioned on gasket 44. More specifically, gasket surface 192 is positioned against gasket 44. Bolts 258 are inserted through bolt holes 186 in flange 172 and bolt holes 48 in tank 12, and nuts 260 and 262 are used to secure bolts 258 within holes 186 and 48.

During operation of vacuum relief valve 100, vacuum relief valve 100 automatically opens to relieve a vacuum within tank 12. More specifically, spring 112 biases seat 130 and/or seal ring 150 against body 104 in the closed position to form an air-tight seal between interior 46 of tank 12 and environment 180. As a vacuum forms within tank 12, such as when a temperature within tank 12 decreases and/or a pressure within tank decreases, the vacuum exerts a force on stem seat 130 and against the spring bias force. When the vacuum force overcomes the spring bias force, stem 102 is pulled downward to the open position to open vacuum relief valve 100. When vacuum relief valve 100 is in the open position, air flows from environment 180, into chamber 174, past stem seat 130, and into tank 12 to relieve the vacuum. Once the pressure has increased in tank 12, the vacuum no longer exerts the force on stem seat 130, and the spring bias force pulls stem seat 130 and/or seal ring 150 into contact with body 104 to close vacuum relief valve 100.

Sight glasses 108 and 110, retention device 164, and/or the location of stem seat 130 facilitate servicing vacuum relief valve 100. More specifically, such features facilitate inspecting, servicing seal ring 150, disassembling vacuum relief valve 100, servicing sight glass 108 and/or 110, and/or servicing screen 246, and/or performing any other servicing and/or maintenance tasks.

To inspect vacuum relief valve 100, vacuum relief valve 100 remains coupled to tank 12. While vacuum relief valve 100 is coupled to tank 12, an operator directs a light, such as light from a flashlight, through first sight glass 108 and looks into chamber 174, and more particularly into sealing area 237, through second sight glass 110. The operator can additionally or alternatively direct the light through second sight glass 110 and look through first sight glass 108. When the operator looks through sight glass 108 and/or 110, the operator can view 360 degrees of sealing area 237, such as 360 degrees of neck 132, conical portion 144, seal ring 150, and/or seat 130. As such, by looking through sight glass 108 and/or 110, the operator can inspect a condition of components within sealing area 237, such as seal ring 150, to determine whether vacuum relief valve 100 is contaminated, determine whether vacuum relief valve 100 is seated properly, and/or determine whether leakage is occurring. For example, if the material within tank 12 is within lower portion 222 of chamber 174 and/or on seal ring 150 and/or stem 102, the operator can determine that vacuum relief valve 100 is experiencing leakage without removing vacuum relief valve 100 from railcar 10. In another example, the operator can inspect seal ring 150 as assembled while a car leak test is performed. By allowing inspection of vacuum relief valve 100 while coupled to railcar 10, vacuum relief valve 100 enables the operator to inspect vacuum relief valve 100 as often as desired with only the use a light source.

When the operator has determined that seal ring 150 should be serviced, the operator uncouples vacuum relief valve 100 from tank 12. More specifically, the operator removes upper nuts 260 from bolts 258 to remove vacuum relief valve 100 from tank 12. The operator then grips gripping projection 138 and pulls downward on stem 102 to reveal seal ring 150. Upper spring stop 156 prevents complete removal of stem 102 from body 104 while inspecting and/or servicing seal ring 150. The position of stem seat 130 at lower surface 190 of body 104 enables access to seal ring 150 without disassembly of vacuum relief valve 100. While stem 102 is extended from lower surface 190 of body 104, the operator can remove seal ring 150 and position a new seal ring 150 within channel 142 and/or re-adjust seal ring 150 with respect to stem 102. Once seal ring 150 has been serviced, the operator releases gripping projection 138 and re-couples vacuum relief valve 100 to tank 12 using bolts 258 and nuts 260 and/or 262.

During disassembly of vacuum relief valve 100, retention device 164 prevents stem 102 from falling into tank 12. As such, some tasks, such as servicing spring 112, can be performed while vacuum relief valve 100 is coupled to tank 12. However, it will be understood, that vacuum relief valve 100 can be uncoupled from tank 12 for disassembly. In the exemplary embodiment, to disassemble vacuum relief valve 100, tamper resistant device 248 is broken and/or removed and hood fasteners 126 are removed from hood 106 and body 104. Hood 106 is then removed from body 104. Upper spring stop 156 is removed from stem 102. Without upper spring stop 156 coupled to stem 102, stem 102 falls downward and retention device 164 contacts lip 210 to retain stem 102 within body 104 when vacuum relief valve 100 is positioned upright. More specifically, a spring bias of retention device 164 forces retention device 164 against inner surface 212 and/or lip 210 to retain stem 102 within stem collar 152.

To remove stem 102 from body 104 after upper spring stop 156 has been removed, the operator pulls on gripping projection 138 with sufficient force to overcome the spring bias of retention device 164. When the spring bias of retention device 164 is overcome, retention device 164 retracts within stem 102 and substantially out of contact with lip 210. When stem 102 and hood 106 are uncoupled from body 104, vacuum relief valve 100 is considered to be disassembled.

To remove screen 246 from body 104, the operator removes hood fasteners 126 and hood 106 and slides screen 246 upward off body 104. As such, screen 246 can be serviced without removing vacuum relief valve 100 from tank 12. To service sight glass 108 and/or 110, the operator unscrews and/or uncouples sight glass 108 and/or 110 from sight port 168 and/or 170, respectively. During unscrewing, tack weld 256 breaks to enable sight glass 108 and/or 110 to be removed.

FIG. 7 is a cross-sectional view of a first alternative embodiment of a vacuum relief valve 300 that may be used with railcar 10 (shown in FIG. 1). Unless otherwise described, vacuum relief valve 300 includes components that are similar to the components described above with reference to vacuum relief valve 100 (shown in FIGS. 2-6). Vacuum relief valve 300 couples to railcar 10 using a threaded portion 302 rather than using flange 172 (shown in FIGS. 2-4 and 6).

In the exemplary embodiment, a body 303 of vacuum relief valve 300 includes a shoulder 304 rather than flange 172. More specifically, shoulder 304 is similar to flange 172 except shoulder 304 has a smaller diameter than a diameter of flange 172 and does not include bolt holes 186 (shown in FIGS. 2-4 and 6). Threaded portion 302 is defined in side wall 120 along an outer surface 306 of a lower portion 308 of side wall 120, from a lower surface 310 of shoulder 304 to a lower end 312 of body 303. Threaded portion 302 is configured to couple vacuum relief valve 300 to railcar 10. In the exemplary embodiment, threaded portion 302 defines a bottom chamber 314 in which seat 130 and seal ring 150 are positioned. When a vacuum formed within railcar 10 exerts a force on stem 102, stem 102 is pulled downward into and/or through bottom chamber 314.

Because seat 130 and seal ring 150 are positioned within bottom chamber 314 and/or positioned adjacent threaded portion 302 and may not extend from body 303 past lower end 312, vacuum relief valve 300 may require a tool and/or disassembly of vacuum relief valve 300 to service seal ring 150 and/or seat 130. However, sight glass 108 and/or sight glass 110 (shown in FIGS. 2 and 4) enables visual inspection of components within sealing area 237, such as seal ring 150, without disassembling vacuum relief valve 300 and/or uncoupling vacuum relief valve 300 from railcar 10. Further, stem 102 is retained within body 303 during uncoupling and/or disassembly by stem retention device 164.

FIG. 8 is a cross-sectional view of a second alternative embodiment of a vacuum relief valve 400 that may be used with railcar 10 (shown in FIG. 1). Unless otherwise described, vacuum relief valve 400 includes components that are similar to the components described above with reference to vacuum relief valve 100 (shown in FIGS. 2-6). Vacuum relief valve 400 further includes threaded connection portion 402 rather than flange 172 (shown in FIGS. 2-4 and 6).

In the exemplary embodiment, body 403 of vacuum relief valve 400 includes connection portion 402. Connection portion 402 includes a shoulder 404, a lower side wall 406, and a threaded portion 408. More specifically, body 403 includes shoulder 404 rather than flange 172. Shoulder 404 is similar to flange 172 except shoulder 404 has a smaller diameter than a diameter of flange 172 and does not include bolt holes 186 (shown in FIGS. 2-4 and 6). Lower side wall 406 extends between a lower surface 410 of shoulder 404 to an upper end 412 of threaded portion 408. In the exemplary embodiment, lower side wall 406 has a diameter that is larger than a diameter of threaded portion 408. As such, lower side wall 406 includes a lower shoulder 414 that is defined where lower side wall 406 is formed with or coupled to threaded portion 408.

Threaded portion 408 is defined along an outer surface 416 of a wall 418 that extends from lower side wall 406 to a lower end 420 of body 104. Threaded portion 408 is configured to couple vacuum relief valve 400 to railcar 10. In the exemplary embodiment, lower side wall 406 and/or threaded portion 408 define a bottom chamber 422 in which seat 130 and seal ring 150 are positioned. When a vacuum formed within railcar 10 exerts a force on stem 102, stem 102 is pulled downward into and/or through bottom chamber 422.

Because seat 130 and seal ring 150 are positioned within bottom chamber 422 and/or positioned adjacent threaded portion 408 and may not extend from body 403 past lower end 420, vacuum relief valve 400 may require a tool and/or disassembly of vacuum relief valve 400 to service seal ring 150 and/or seat 130. However, sight glass 108 and/or sight glass 110 (shown in FIGS. 2 and 4) enables visual inspection of components within sealing area 237, such as seal ring 150, without disassembling vacuum relief valve 400 and/or uncoupling vacuum relief valve 400 from railcar 10. Further, stem 102 is retained within body 403 during uncoupling and/or disassembly by stem retention device 164.

The above-described embodiments provide both internal and external visual inspection without disassembly and/or removal of a vacuum relief valve. Further, the embodiments described herein enable the removal and/or replacement of a seal ring without disassembling the vacuum relief valve. Accordingly, the vacuum relief valve described herein reduces maintenance cost and/or downtime, as compared to known vacuum relief valves that require disassembly, rebuilding, resetting, and/or retesting of the valve.

Moreover the above-described embodiments include a screen that prevents contaminates and/or debris from entering the valve while allowing air into the valve. Use of the tamper resistant device through head screws and/or the screen provides evidence of tampering if the tamper resistant device is damaged or missing. Additionally, the spring-loaded stem retention feature described herein prevents the loss of the stem into the container, yet allows for easy removal of the stem when necessary.

Exemplary embodiments of a vacuum relief valve and method of assembling the same are described above in detail. The valve and method are not limited to the specific embodiments described herein, but rather, components of apparatus and/or steps of the method may be utilized independently and separately from other components and/or steps described herein. For example, the vacuum relief valve may also be used in combination with other containers and methods, and are not limited to practice with only the railcar containers and methods as described herein. Further, the exemplary embodiment can be implemented and utilized in connection with many other valve applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vacuum relief valve comprising:
   a body comprising a side wall and a lip;
   a stem that is movable with respect to said body between an open position and a closed position, said stem biased in the closed position;
   a fastener coupled to said stem, said fastener configured to couple said stem to said body;
   a retention device coupled to said stem, wherein said lip is configured to engage said retention device when said fastener is uncoupled from said stem; and
   a first sight glass coupled to said body and configured to enable visual inspection of a sealing area of said vacuum relief valve, said sealing area comprising at least a portion of said stem.

2. A vacuum relief valve in accordance with claim 1 further comprising at least one vent opening defined through said side wall of said body.

3. A vacuum relief valve in accordance with claim 2 further comprising a screen coupled to said body and positioned over said at least one vent opening.

4. A vacuum relief valve in accordance with claim 1 further comprising a hood coupled to a top of said side wall of said body.

5. A vacuum relief valve in accordance with claim 4 further comprising at least one vent opening defined through said side wall of said body, said hood at least partially concealing said at least one vent opening.

6. A vacuum relief valve in accordance with claim 4 further comprising hood fasteners configured to couple said hood in direct contact with said top of said body.

7. A vacuum relief valve in accordance with claim 6 further comprising a tamper resistant device coupled to said hood fasteners, said tamper resistant device comprising a car seal.

8. A vacuum relief valve in accordance with claim 1, wherein said stem comprises a seat and a seal ring, said seat positioned adjacent a bottom surface of said body when said stem is in the closed position, wherein said stem is movable to the open position to allow air to flow through a chamber of said body that is defined by said side wall.

9. A vacuum relief valve in accordance with claim 8, wherein said seal ring engages said bottom surface of said body to form an air-tight seal when said stem is in the closed position.

10. A vacuum relief valve in accordance with claim 1 further comprising a first sight port extending from said side wall at an angle that enables the visual inspection of said sealing area, said first sight port defining a first port opening through said side wall, said first sight glass coupled to said first sight port.

11. A vacuum relief valve in accordance with claim 10 further comprising:
    a second sight port extending from said side wall at the angle and defining a second port opening extending through said side wall; and
    a second sight glass coupled to said second sight port, first sight glass configured to enable viewing of said sealing area and said second sight glass configured to allow light to be directed toward said sealing area.

12. A vacuum relief valve in accordance with claim 1, wherein said body comprising a flange extending from said side wall, said flange configured to couple said vacuum relief valve to a container.

13. A vacuum relief valve in accordance with claim 1 further comprising:
    a spring coupled about said stem and supported by said body; and
    an upper spring seat coupled to said stem and in contact with said spring, said spring and said upper spring seat configured to provide a predetermined pressure setting for said vacuum relief valve.

14. A railcar comprising:
    a container; and
    a vacuum relief valve coupled to said container, said vacuum relief valve comprising:
        a body comprising a side wall and a lip;
        a stem that is movable with respect to said body between an open position and a closed position, said stem biased in the closed position;
        a fastener coupled to said stem, said fastener configured to couple said stem to said body;
        a retention device coupled to said stem, wherein said lip is configured to engage said retention device when said fastener is uncoupled from said stem; and
        a first sight glass coupled to said body and configured to enable visual inspection of a sealing area of said vacuum relief valve, said sealing area comprising at least a portion of said stem.

15. A railcar in accordance with claim 14, wherein said vacuum relief valve comprises a second sight glass, said first sight glass configured to enable viewing of said sealing area and said second sight glass configured to allow light to be directed toward said stem.

16. A railcar in accordance with claim 14, wherein said vacuum relief valve further comprises a seat and a seal ring coupled to said seat, said seat positioned adjacent a bottom surface of said body when said stem is in the closed position wherein said stem is movable to the open position to allow air to flow through a chamber of said body that is defined by said side wall.

17. A railcar in accordance with claim 14, wherein said vacuum relief valve further comprises at least one vent opening defined through said side wall of said body.

18. A method for assembling a vacuum relief valve that includes a body comprising a side wall, a stem that is movable with respect to the body between an open position and a closed positioned, wherein the stem is biased in the closed position, and at least one sight glass configured to enable visual inspection of a sealing area of the vacuum relief valve, said method comprising:
    inserting the stem through a stem collar of the body, a seat of the stem positioned adjacent a bottom surface of the body when the stem is in the closed position;
    inserting a spring about the stem and the stem collar;
    coupling an adjustable spring stop to the stem adjacent to an end of the spring;
    inserting a retention device into the stem, the retention device configured to retain the stem within the stem collar when the adjustable spring stop is removed from the stem; and
    coupling the at least one sight glass to the body at a location for the visual inspection of the sealing area.

19. A method in accordance with claim 18 further comprising coupling a seal ring about a seat of the stem, the seal ring within the sealing area and positioned directly against the body when the stem is in the closed position.

20. A method in accordance with claim 18 wherein inserting a spring about the stem and the stem collar further includes providing a predetermined pressure setting for the vacuum relief valve and biasing the stem in the closed position.

21. A method in accordance with claim 18 further comprising coupling a hood to a top of the side wall of the body using at least one hood fastener.

22. A method in accordance with claim 21 further comprising coupling a tamper resistant device to the at least one hood fastener.

23. A method in accordance with claim 18 further comprising inserting the side wall of the body into a screen, the screen covering a vent opening defined through the side wall.

24. A method in accordance with claim 18 wherein the vacuum relief valve further comprises at least one sight port extending from side wall at an angle that enables the visual inspection of the sealing area, the at least one sight port defining a port opening through the side wall, said method further comprising:
  coupling the at least one sight glass to the at least one sight port; and
  tack welding the at least one sight glass to the at least one sight port.

* * * * *